Nov. 9, 1943.    C. F. GREINER    2,334,086
DRIVE ROLL ASSEMBLY
Filed March 9, 1942    2 Sheets-Sheet 1
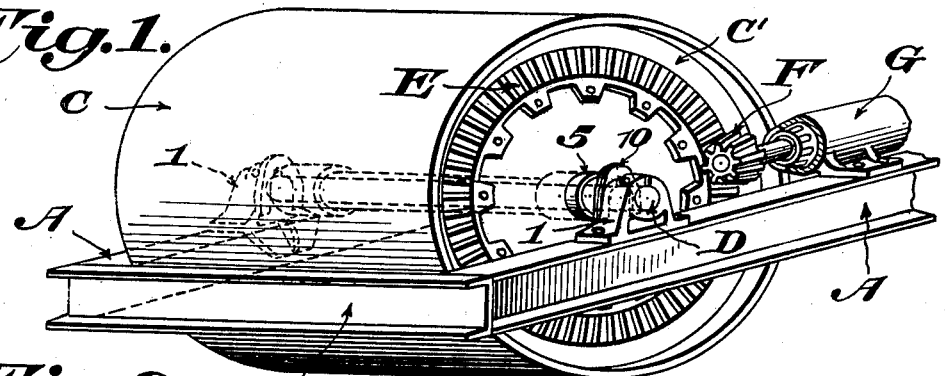
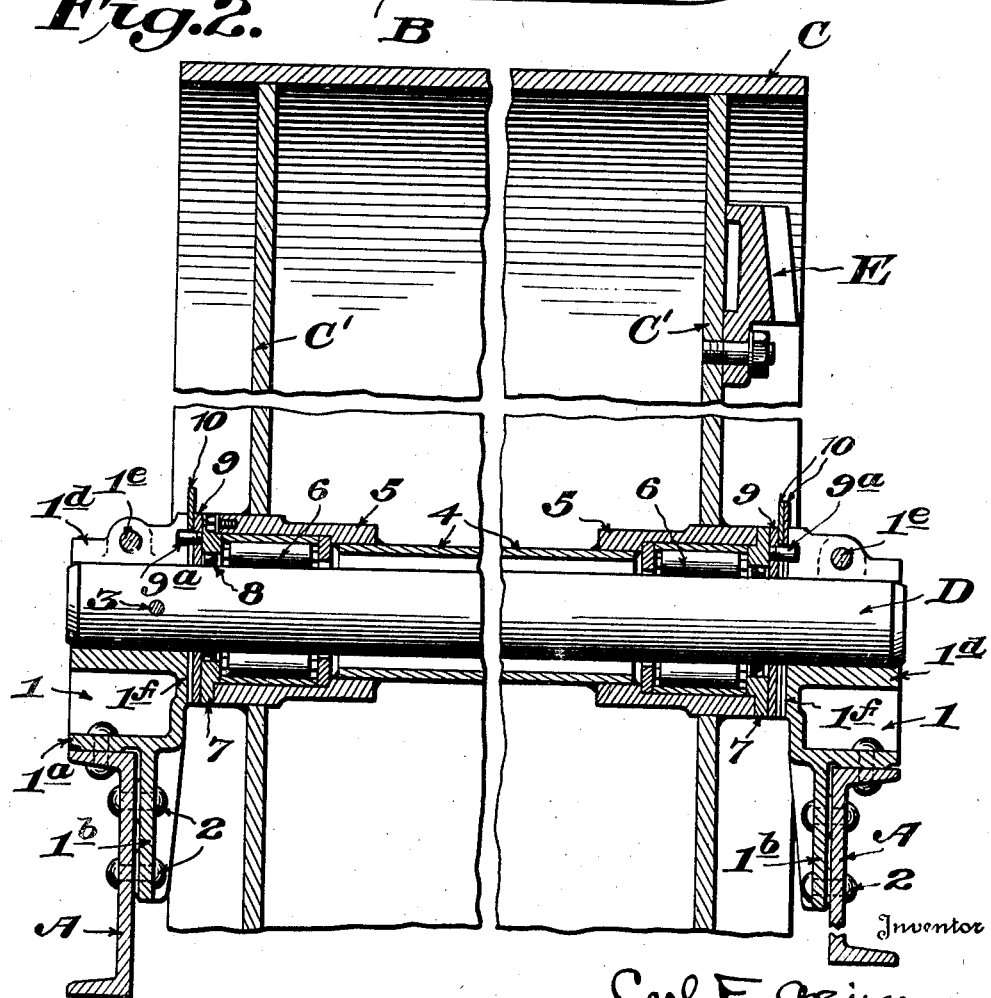
Inventor
Carl F. Greiner
By Alexander Howell
Attorneys

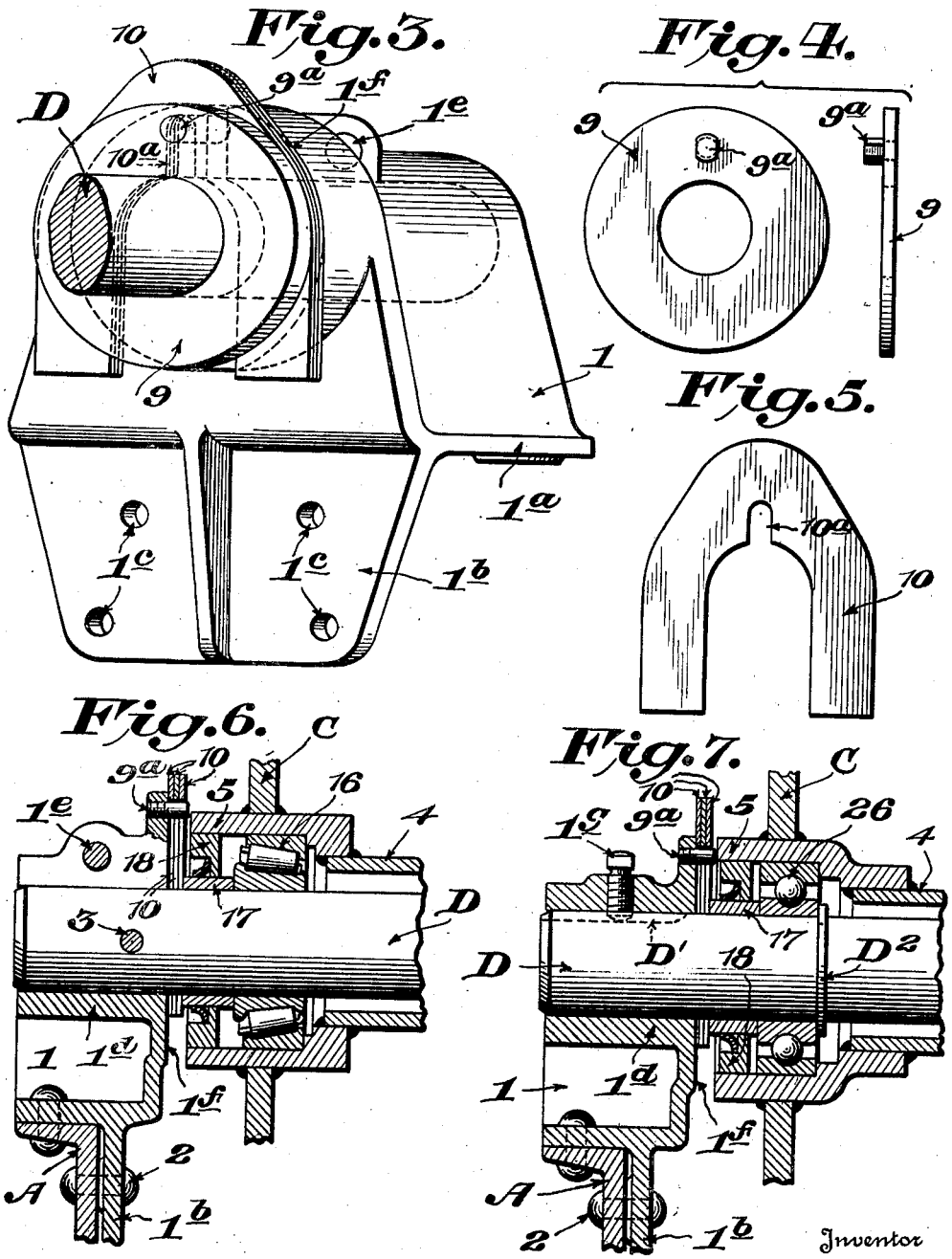

Patented Nov. 9, 1943

2,334,086

UNITED STATES PATENT OFFICE 2,334,086

DRIVE ROLL ASSEMBLY

Carl F. Greiner, Springfield, Ohio, assignor to The Buffalo-Springfield Roller Co., Springfield, Ohio, a corporation of Ohio Application March 9, 1942, Serial No. 433,983

13 Claims. (Cl. 180—20)

This invention is a novel drive roll assembly, particularly adapted for use in connection with the drive rolls of tandem type road rollers, and the principal object of the invention is to provide an assembly presenting certain definite advantages with respect to low cost, manufacturing simplicity, and operating performance.

Another object of my invention is to provide a bevel gear drive tandem roller, the particular advantages of the bevel gear drive residing in the elimination of the use of spur gears and their inherent high cost, and also residing in the provision of a drive having the characteristic of utmost simplicity, the bevel gear drive being so designed as to provide compensating adjustments due to wear of the gears, the adjustments being accomplished without disturbing the major roll axle bearing parts, thereby maintaining the efficiency which the bevel gear drive had when the machine was new. Furthermore, said adjustments may be utilized to accommodate manufacturing variations, thus facilitating production and assembly with a resultant reduction of cost.

Another object of my invention is to provide an adjustable bevel gear drive roll assembly permitting take-up for wear in the gear train. Excessive back lash in the gear train is undesirable. In spur gear drives back lash cannot be eliminated. Only an adjustable bevel gear drive can keep back lash down to a minimum.

A further object of the invention is to provide an adjustable bevel gear drive roll assembly including readily removable and insertable shims for the purpose of taking up end play due to wear of the thrust washers, and for accommodating manufacturing variations at the original factory assembly.

A still further object is to provide an adjustable bevel gear drive roll assembly, of the above type, providing extremely quick, economical and practical means for accomplishing the foregoing objects, eliminating the necessity of having to dismantle heavy parts in order to add or remove the shims, said shims in my assembly being of U-shape plan and adapted to be inserted over the axle between the adjacent faces of the axle bearing bracket and the non-rotating thrust washers, instead of being assembled in a washer-like fashion over the ends of the axle, lock pins which may be carried by the non-rotating thrust washers and entered into holes in the axle bearing brackets, or which may be carried by the bearing brackets and entered into holes in the non-rotating thrust washers, serving the dual purpose of preventing the related shims from rotating and from falling off the axle, as well as serving to hold the non-rotating thrust washers stationary adjacent to their related rotating thrust washers adjacent each end of the roll hub, thus controlling the points of wear.

Other minor objects of the invention will be hereinafter set forth.

I will explain the invention with reference to the accompanying drawings which illustrate several practical embodiments thereof, to enable others familiar with the art to adopt and use the same; and will summarize in the claims, the novel features of construction, and novel combinations of parts, for which protection is desired.

In said drawings:

Fig. 1 is a perspective view of the drive roll of a tandem type road roller showing my novel bevel gear drive assembly.

Fig. 2 is an enlarged longitudinal section, partly broken away, through the drive roll mounted on the axle and equipped with roller bearings, and illustrating the use of my novel shims in connection with said roller bearings.

Fig. 3 is an enlarged perspective view of an axle bearing bracket showing the shims and non-rotatable thrust washers in place adjacent an end of the axle.

Fig. 4 shows a plan and side elevation, respectively, of a stationary thrust washer with its lock pin.

Fig. 5 is a plan view of one of the shims.

Fig. 6 is a longitudinal section illustrating the use of tapered roller bearings, such as Timken bearings, in the drive roll assembly, in place of the roller bearings shown in Fig. 2.

Fig. 7 is a longitudinal section similar to Fig. 6 illustrating the use of ball bearings instead of roller or tapered roller bearings.

As shown in Fig. 1, the frame of the road roller, or other vehicle, includes opposite side members A and an end member B, said members A and B being preferably heavy channel irons secured together at their ends in any desired manner to provide an open rigid frame. Between the side members A—A is journaled the drive roll C, the same being rotatably mounted upon axle D journaled in axle bearing brackets I mounted upon the tops of the side members A—A.

As shown in Figs. 2 and 3, each axle bearing bracket I is provided with a flat base portion 1a adapted to seat directly upon the top of the side member A, and is provided with a depending flange 1b adapted to engage the web of the side member, flange 1b being provided with holes 1c for the reception of rivets 2 or the like, whereby the axle bearings 1—1 are fixedly secured in position. In each bearing 1 above base 1a is a split bearing portion 1d snugly receiving the end of axle D, said split bearing portion being provided with perforated ears adjacent the split receiving bolts 1e, or the like, for clamping the split bearings around the ends of axle D. Preferably a pin 3 transfixes one of the bearing portions 1d and the axle D, to prevent axial movement of the axle in brackets 1, and likewise to prevent rotation of the axle. The inner face 1f of each bracket 1 is a plane surface disposed normal to the axis of axle D, for the purpose hereinafter described.

Drive roll C is provided with an axle housing 4 (Fig. 2) having its ends entering roller bearing housings 5 which are welded or otherwise secured to the end plates C' of roll C so as to rotate therewith. On one end plate C' of roll C is a bevel ring gear E meshing with a bevel pinion F on the main drive shaft journaled in a housing G mounted upon the adjacent side member A, said pinion F being driven through a suitable clutch and change speed gears from the vehicle motor or engine in the usual manner, and said housing G being fixedly mounted upon the side member A.

According to my invention, means are provided whereby in the bevel gear drive of the above type compensation may be secured for adjustment for wear of the gears E and F by shifting the drive roll C on the axle D, thus regaining the original efficiency which the drive had when new. Furthermore, said means permits adjustments to accommodate manufacturing variations, thus facilitating production and assembly with a resultant reduction in cost, and such adjustments being effected without disturbing the major roll axle bearing parts.

As shown in Fig. 2, within the roller bearing housing 5 at each end of roll C, is a roller bearing indicated generally by the numeral 6, said bearing snugly fitting within the housing 5 and the rollers thereof directly engaging axle D. The inner end of each roller bearing assembly engages a shoulder formed adjacent the inner end of the related bearing housing 5, the outer end of the housing 5 being closed by a rotating thrust washer 7, a suitable packing 8 being provided to prevent the escape of lubricant from the bearing housing 5. Preferably each rotating thrust washer 7 is of substantial thickness. Around the axle D contacting the outer face of the rotating thrust washer 7 is a non-rotatable thrust washer 9, Fig. 4, said washer 9 being also of substantial thickness. If desired, the washer 9 may carry a lock pin 9a adapted to engage a hole or recess formed in the inner face 1f of the axle bracket 1, whereby the thrust washer 9 is permitted axial adjustment with respect to the axle D but is prevented from rotating thereon; or the lock pin 9a may be carried by the bracket 1 and may enter a hole or recess in the washer 9 to serve the same purpose.

The above construction permits the drive roll C and its roller bearings 6 to be shifted axially of axle D in order to adjust the gear assembly E—F to compensate for wear or for manufacturing variations. In order to position the bevel ring gear E with respect to the bevel pinion F, novel shims 10 (Fig. 5) are provided, said shims 10 being of substantially U-shaped plan and being adapted to be inserted between the faces 1f of axle bearings 1 and the outer faces of the non-rotating thrust washers 9, as clearly shown in Fig. 2, any number of said shims being insertable in such positions. The legs of each shim 10 are spaced apart a distance slightly greater than the diameter of axle D and in the base thereof is a slot 10a adapted when the shims are inserted into the positions shown in Fig. 2 to receive the pins 9a of the non-rotatable thrust washers 9, so as to prevent rotation of the shims.

Any of the shims 10 at one end of the axle D may be readily removed from its assembly and inserted in the corresponding position at the other end of the axle D, thus shifting the entire roll assembly C, together with its roller bearings 6 on the axle D in order to adjust the bevel ring gear E until the same is in the proper position with respect to bevel pinion F. Likewise, additional shims 10, the proper or required number at each end, may be added when required to take up any wear which has occurred by the rubbing surfaces of thrust washers 9 and 7. Equal thicknesses of shims added at both ends will not effect longitudinal movement of the roller C and gear E. This is an important point since when straight roller bearings such as shown in Fig. 2 are used for the roll C, thrust washers 7 and 9 are required.

While in Fig. 2 the positions of the non-rotatable thrust washers 9 are variable to accommodate take-up for wear, the use of lock pins 9a thereon permits lateral shifting of the washers, preventing rotation of the open-sided or U-shaped shims 10 which must be kept from rotation in order to avoid subsequent loss. Transfer of shims from one end to the other of the assembly provides an extremely quick, economical and practical means of adjusting the bevel ring gear E with respect to bevel pin F; and it is not necessary to dismantle any parts of the assembly to transfer or add shims since the U-shaped shims can be directly inserted over the axle B instead of having to slip washer-like shims over the ends of the axle.

In Fig. 6 is shown a modification in which the straight roller bearings 6 are replaced by tapered roller bearings 16, such as Timken bearings, and while only one assembly is shown it is understood of course that the identical construction would be used at both ends of axle D. In this modification the tapered roller bearing assembly likewise engages a shoulder at the inner end of bearing housing 5, the outer end of the bearing being engaged by a collar 17 closely fitting axle D; the outer end of said collar directly engaging the innermost shim 10 of the group of shims which are identical with those shown in Fig. 5, which shims 10 are held from rotation by means of the pin 9a carried by the axle bracket 1. The bearing shown in Fig. 6 does not require the use of thrust washers as the bearing itself takes the thrust directly, collar 17 and shims 10 acting as backing up members to oppose separating force of bearing 16.

A grease retaining plate 18 is provided in the outer end of bearing housing 5 disposed between the wall of the housing 5 and the collar 17.

The function of shims 10 in Fig. 6 is the same as above described in connection with Fig. 2, the transfer of shims from one end of the axle to the other providing for longitudinal adjustment of the entire roll assembly on axle D to vary the position of the bevel ring gear E without disturbing the bearing adjustment. By adding or removing any of the shims 10, the collars 17 will be shifted, thus tightening or loosening the adjustment of the bearings.

In Fig. 7 a still further modification is shown utilizing ball bearings 26 in place of the roller bearings 6 (Fig. 2) or tapered roller bearings 16 (Fig. 6). In this modification axle D is provided with a longitudinal groove or slot D' adjacent one or both ends receiving a set screw 1g in the axle bearing 1d of the bracket 1, said key preventing rotation of axle D while permitting longitudinal adjustment thereof. The inner end of ball bearing unit 26 also engages a shoulder formed at the inner end of bearing housing 5 and also engages an annular flange D2 formed on the axle D. The outer end of the ball bearing unit 26 is engaged directly by a collar 17, as in Fig. 6, and the outer end of the bearing housing 5 is closed, as in Fig. 6, by a grease-retaining plate 18. The outer end of ring 17 is engaged directly by the innermost shim 10 of the group of shims which are held from rotation by means of lock pins 9a carried by the axle bracket 1. Transferring shims 10 from one end of the axle to the other, when set screws 1g are loosened, will shift the entire roll assembly including axle D, without disturbing the bearing adjustment, thus providing adjustment of the bevel ring gear with respect to the bevel drive pinion.

However, the annular flange D2 of Fig. 7 might be omitted, and the set screw 1g and slot D' replaced by a pin 3 and bolt 1e as shown in Fig. 6, and such assembly would also function properly. In such modified assembly the transfer of shims from one end to the other of the axle would shift collars 17 longitudinally on the axle resulting in a corresponding longitudinal shifting of the roll assembly carrying the bevel gear E. The function of the shims in this case would be to adjust the bevel gear E for wear, and to provide for manufacturing variations, as the ball bearing 26 itself does not permit take-up for bearing wear.

My novel drive roll assembly permits take-up for wear in the bevel gear train whereby excessive and undesirable back lash can be kept down to a minimum, and in fact can be eliminated. The end play, due to wear on the thrust washers 7, can be taken up by the addition of shims. Manufacturing variations can be accommodated, by the use of shims, at the original factory assembly. My design provides extremely quick, economical and practical means for effecting the foregoing adjustments, and eliminates the necessity of having to dismantle heavy parts to transfer or add shims, as the U-shaped shims 10 can be directly inserted over the axle D instead of being assembled in a washer-like fashion over the ends of the axle. The lock pins 9a, anchored in the non-rotatable thrust washers or in the axle brackets, serve the dual purpose of preventing the shims 10 from rotating and falling off of the axle, as well as holding the non-rotatable thrust washers 9 stationary and adjacent to the rotating thrust washers 7 at the ends of the roll hubs, thus controlling the points of wear.

I do not limit my invention to the exact forms shown in the drawings, for obviously changes may be made therein within the scope of the claims.

I claim:

1. A drive roll assembly comprising a frame; spaced axle brackets on the frame; an axle mounted in said brackets; a drive roll rotatably mounted on said axle and having axle bearing housings; a bevel ring gear on the drive roll; a bevel drive pinion journaled on the frame and meshing with the ring gear; anti-friction bearing units in said housings; thrust members on the axle engaging the outer ends of said bearing units; removable shims having open-ended axle receiving slots interposed between the axle brackets and thrust members; and means for preventing rotation of the shims on the axle.

2. In a drive roll assembly as set forth in claim 1, said bearing units containing straight roller bearings confined in said housings between said thrust members and shoulder formed within the housings.

3. In a drive roll assembly as set forth in claim 1, said bearing units containing straight roller bearings confined in said housings between said thrust members and shoulders formed within the housings; and means for preventing axial movement of the axle in said brackets.

4. In a drive roll assembly as set forth in claim 1, said bearing units containing beveled roller bearings, and said units being confined in said housings between said thrust members and shoulders formed within the housing.

5. In a drive roll assembly as set forth in claim 1, said bearing units containing beveled roller bearings, and said units being confined in said housings between said thrust members and shoulders formed within the housing; and means for preventing axial movement of the axle in said brackets.

6. In a drive roll assembly as set forth in claim 1, said bearing units containing ball bearings, and said units being confined in said housings between said thrust members and shoulders formed within the housing.

7. In a drive roll assembly as set forth in claim 1, said bearing units containing ball bearings, and said units being confined in said housings between said thrust members and shoulders formed within the housing, and means for preventing axial movement of the axle in said brackets.

8. In a drive roll assembly as set forth in claim 1, said bearing units containing ball bearings, and said units being confined in said housings between said thrust members and shoulders formed within the housing and an annular flange carried by the axle; and said axle being axially movable in the bearing brackets, whereby the axle will be shifted axially with the adjustment of the drive roll.

9. A drive roll assembly comprising a frame; spaced axle brackets on the frame; an axle mounted in said brackets; a drive roll rotatably mounted on said axle and having axle bearing housings; a bevel ring gear on the drive roll; a bevel drive pinion journaled on the frame and meshing with the ring gear; anti-friction bearing units in said housings; rotatable thrust washers engaging the outer ends of said housings; non-rotatable thrust members engaging the outer faces of the rotatable washers; lock pins transfixing the non-rotatable thrust members and axle brackets; and removable shims having open-ended axle receiving slots interposed between the axle brackets and non-rotatable thrust members, said slots each having reduced portions at their inner ends receiving the related lock pins.

10. A drive roll assembly comprising a frame; spaced axle brackets on the frame; an axle mounted in said brackets; a drive roll rotatably mounted on said axle and having axle bearing housings; a bevel ring gear on the drive roll; a bevel drive pinion journaled on the frame and meshing with the ring gear; anti-friction bearing units in said housings; thrust collars on the axle engaging the outer ends of said bearing units; pins extending from the inner faces of the said brackets; and removable shims having open-ended axle receiving slots interposed between the axle brackets and thrust collars, said slots each having reduced portions at their inner ends receiving their related pins.

11. A drive roll assembly comprising a frame; spaced axle brackets on the frame; an axle fixedly mounted in said brackets; a drive roll rotatably mounted on said axle and having axle bearing housings; a bevel ring gear on the drive roll; a bevel drive pinion journaled on the frame and meshing with the ring gear; straight roller bearing units in said housings; rotatable thrust washers closing the outer ends of said housings; non-rotatable thrust members disposed between the rotatable washers and the inner faces of the axle brackets; lock pins transfixing the non-rotatable thrust members and the axle brackets; and inverted U-shaped shims straddling the axle and disposed between the axle brackets and non-rotatable thrust members, said shims each having a slot receiving its related lock pin to prevent rotation of the shims on the axle; the shims being readily insertable, removable, and interchangeable from positions adjacent one axle bracket to the other, whereby the drive roll and its bevel ring gear may be adjusted with respect to the bevel drive pinion, and whereby compensation for wear at the thrust washers may be effected.

12. A drive roll assembly comprising a frame; spaced axle brackets on the frame; an axle fixedly mounted in said brackets; a drive roll rotatably mounted on said axle and having axle bearing housings; a bevel ring gear on the drive roll; a bevel drive pinion journaled on the frame and meshing with the ring gear; bevel roller bearing units in said housings; thrust collars engaging the outer ends of said bearing units; inverted U-shaped shims straddling the axle and disposed between the axle brackets and thrust collars; and means for preventing rotation of the shims on the axle; the shims being readily insertable, removable, and interchangeable from positions adjacent one axle bracket to the other, whereby the drive roll and its bevel ring gear may be adjusted with respect to the bevel drive pinion, and whereby adjustment of the bearings may be effected.

13. A drive roll assembly comprising a frame; spaced axle brackets on the frame; an axle non-rotatably mounted in said brackets; a drive roll rotatably mounted on said axle and having axle bearing housings; a bevel ring gear on the drive roll; a bevel drive pinion journaled on the frame and meshing with the ring gear; ball bearing units in said housings; thrust collars engaging the outer ends of said bearing units; inverted U-shaped shims straddling the axle and disposed between the axle brackets and thrust collars; and means for preventing rotation of the shims on the axle; the shims being readily insertable, removable, and interchangeable from positions adjacent one axle bracket to the other, whereby the drive roll and its bevel ring gear may be adjusted wih respect to the bevel drive pinion.

CARL F. GREINER.